June 1, 1965 J. J. A. PEEK ETAL 3,187,284

VARIABLE INDUCTANCE DEVICE

Original Filed June 24, 1957

INVENTORS
JOHANNES J. A. PEEK
HERRE RINIA &
SIMON DUINKER

BY Frank R. Trifari
AGENT

United States Patent Office 3,187,284

Patented June 1, 1965

3,187,284

VARIABLE INDUCTANCE DEVICE

Johannes Josephus Alphonsus Peek, Herre Rinia, and Simon Duinker, all of Eindhoven, Netherlands, assignors to North American Philips Company, Inc., New York, N.Y., a corporation of Delaware Original application June 24, 1957, Ser. No. 667,619, now Patent No. 3,100,852, dated Aug. 13, 1963. Divided and this application Oct. 30, 1962, Ser. No. 280,174

Claims priority, application Netherlands, July 28, 1956, 209,395

2 Claims. (Cl. 336—135)

This application is a division of application Serial No. 667,619 filed June 24, 1957, now U.S. Patent No. 3,100,852 granted August 13, 1963.

This invention relates to magnetic circuits and devices, and in particular to these circuits and devices which operate with variable reluctance.

Known circuits and devices of the foregoing type generally include an airgap and within the airgap a slidable, soft ferromagnetic member which controls the reluctance of the magnetic circuit by its position in the gap. For instance, when the slidable member completely fills the gap, the reluctance is minimized, whereas when the soft magnetic member is absent from the gap, the reluctance is maximized. These circuits and devices have disadvantages, which derive from the limited motions possible by the soft magnetic member which controls or adjusts the reluctance of the circuits, the limited range of adjustments possible, and the complicated assemblies that sometimes result.

One object of the invention is to provide a new magnetic circuit or device containing variable reluctance means of a type different from that heretofore used.

Another object of the invention is to provide a magnetic circuit and device whose reluctance may be controlled by provision of a rotatable, soft, magnetic member.

These and other objects of the invention are realized in accordance with the invention by providing in series in a magnetic circuit, a movable, soft, ferromagnetic member possessing different magnet permeabilities along different directions. Thus, by orienting this member so that its high-permeability direction is aligned with the flux direction in the circuit, the reluctance offered by the movable member to that flux flow is minimized. On the other hand, by orienting this member so that its low-permeability direction is aligned with the flux flow, the reluctance of the magnetic circuit is maximized. In this way, it has been found that continuous control of the reluctance of a magnetic circuit or magnetic device may be accomplished with simple and thus readily manufactured components. Moreover, it has been found that the range of variation of reluctance is extremely large. While the broad aspects of the invention permit the construction of a wide variety of magnetic devices and circuits, particular improvements are obtained in the manufacture of variable inductors, or transformers requiring means for adjusting the mutual inductancee between its windings. In addition, the invention may be used to construct electromechanical transducers, such as a magnetic pick-up, and may also be used to construct motors and the like.

The invention will now be described in greater detail with reference to the accompanying drawing, in which.

Figure 1:
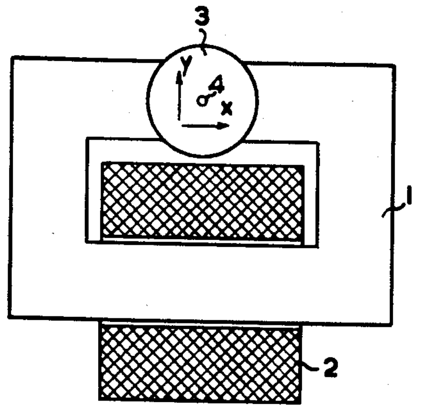
FIG. 1 is a plan view of a variable inductor constructed in accordance with the invention.

Referring now to the drawing, FIG. 1 shows a magnetic circuit for a variable inductor. The inductor comprises a closed core 1 of soft magnetic material, such as the well-known ferromagnetic ferrites. On the core 1 is mounted an exciting winding 2. The core 1 contains a cylindrical bore in which is mounted for rotation a right-circular, solid cylinder 3 constituted of anisotropic, soft, magnetic material, as will shortly be explained. This soft, magnetic member 3, which may project from the bore, is rotatable about its central axis 4. As will be noted, the diameter of the cylinder 3 is greater than the width of the core 1 to ensure that the member 3 is in series in the circuit.

The magnetic member 3 possesses different magnetic permeabilities in two mutually perpendicular directions at right angles to the axis of rotation 4. For example, in the X-direction indicated by the horizontal arrow, the permeability of the member 3 may be ten to twenty times higher than its permeability in the Y-direction, indicated by the vertical arrow. In particular, the magnetic member 3 possesses a higher permeability in all directions parallel to a horizontal plane through the center axis 4 and orthogonal to the plane of the drawing than in any direction perpendicular to the horizontal plane. Such a magnetic member 3 may be made as described in United States application, Serial No. 662,386, filed May 29, 1957, and issued as Patent No. 3,013,976, December 19, 1961. As one illustrative example, the member 3 may be composed of a barium-cobalt-iron oxide compound having the formula $Ba_3Co_2Fe_{24}^{III}O_{41}$. The member 3 may be made by compressing suitable powder to form a block in a magnetic field which can be represented by a vector rotating in a plane at right angles to the direction of compression, which has the effect of orienting the powder particles so that their preferred planes of magnetization lie in parallel. After compression, the block may be sintered in an oxygen-containing atmosphere. From the block may be carved the cylindrical member illustrated in the drawing with the required orientation. In general, suitable materials for the magnetic member 3 will be found among non-metallic or ceramic, ferromagnetic materials of the non-cubic crystalline type having a preferred plane of magnetization. For instance, materials having the formulae $BaZnFe_6O_{11}$ or $BaCo_{0.8}Zn_{1.2}Fe_{16}O_{27}$ or $BaCo_{1.2}Ti_{1.2}Fe_2O_{19}$ may be used. As the material is non-metallic, eddy current losses are kept to a minimum. The material is especially useful in magnetic circuits operative at the higher frequencies. For convenience, magnetic members like the member 3 constituted of a solid block of magnetic material but possessing different permeabilities in different directions will be referred to as an anistropic, soft, magnetic member.

As a consequence of this construction of the member 3, its permeability in the X-direction and all directions parallel thereto, is much higher than in the Y-direction and parallel directions. Thus, in the position of the rotatable member 3 shown in the drawing, the reluctance of the magnetic circuit is a minimum, as the cylinder 3 exhibits very low reluctance by reason of its high permeability in the flux direction, which is, of course, horizontal in the upper leg of the core 1. However, by rotating member 3 about the axis 4 by 90°, either clockwise or counterclockwise, the Y-direction then becomes aligned with the flux flow, and in that Y-direction the member 3 has a minimum permeability and thus a maximum reluctance. In this case the reluctance of the magnetic circuit is maximized. Of course, for positions of the member 3 intermediate these two extremes, the reluctance of the cylinder 3 will vary between its minimum and maximum values, and so will the reluctance of the circuit. With the material described above, it has been found possible to provide a ratio of maximum to minimum permeability of about 10:1 to 20:1 which provides a wide range of variation of the reluctance of the magnetic circuit shown.

Figure 2:
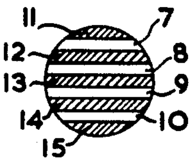
FIG. 2 is a cross-sectional view of a possible modification of the device shown in FIG. 1, which modification, however, produces much inferior results.

Another advantage of the foregoing constructions stems from the fact that in the position of maximum permeability, the cylindrical bore in the core 1 is filed completely with magnetic material permitting the flow of flux therethrough. This is in contrast to a construction as shown in FIG. 2, which shows a cylinder having a similar shape to the cylinder 3 of FIG. 1 but in this case constituted of a plurality of ordinary, soft, magnetic layers 11, 12, 13, 14 and 15 separated by non-magnetic layers 7, 8, 9 and 10. Here the reluctance in the horizontal direction is less than that in a vertical direction, since in the latter position the non-magnetic members are in series and thus impede the flow of flux. However, not only is this laminated member more difficult to construct, but the same large ratio of maximum to minimum permeability found in the member 3 described above is lacking, because even in the low reluctance position of the cylinder there is interposed in the flux path the non-magnetic members 7 to 10, inclusive. The embodiment illustrated in FIG. 1 produces far superior results to that illustrated in FIG. 2.

It will be obvious from the foregoing that the rotatable member 3 need not be a right-circular cylinder, but may also have the form of any other solid of revolution. So, for example, the member 3 can be in the form of a cone, with, of course, the aperture in the core 1 having a complementary shape to accommodate the same.

Figure 3:
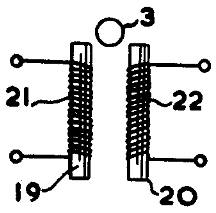
FIG. 3 is a side view of another embodiment of the invention relating to a transformer.

FIG. 3 shows a transformer comprising soft magnetic core members 19 and 20 of the usual material on which are mounted, respectively primary and secondary windings 21 and 22. In the usual manner, a soft, magnetic member may be provided between or in the vicinity of the windings to control the coupling therebetween. In accordance with the invention, this control member comprises a right-circular cylinder 3, as shown in FIG. 1, constituted of anisotropic, soft, magnetic material of the type described in connection with FIG. 1. Thus member 3 is rotatable about an axis at right angles to the plane of the drawing. The coupling between the windings is maximized by rotating the member 3 to a position where its direction of lowest permeability, corresponding to the Y-direction in FIG. 1, is parallel to the longitudinal axes of the cores 19 and 20, which direction is vertical in FIG. 3, so that a low reluctance path exists between the cores 19 and 20. Of course, in a position rotated 90° from this position, the coupling between the windings is minimized. By a proper arrangement of the transformer elements shown, which is within the skill of those skilled in this art, these changes in coupling can be obtained without any appreciable variation of the inductance of the windings 21 and 22.

While the invention has been described in connection with specific embodiments, it will be appreciated by these skilled in the art that other modifications thereof are possible without departing from the spirit and scope of the invention as defined in the appended claims.

What is claimed is:

1. A transformer comprising a pair of windings and in the vicinity of said winding a rotatable magnetic member for varying the coupling between the windings, said rotatable member having a magnetic portion constituted substantially completely of soft magnetic material and possessing substantially different magnetic permeabilities in mutually-perpendicular directions.

2. Apparatus as set forth in claim 1 wherein the magnetic portion is constituted of a sintered, ceramic, ferromagnetic material having a non-cubic crystal structure.

No references cited.

JOHN F. BURNS, *Primary Examiner.*